United States Patent [19]

Hohmann et al.

[11] Patent Number: 5,338,071
[45] Date of Patent: Aug. 16, 1994

[54] PIPE COUPLING

[75] Inventors: Ralf Hohmann, Bruchköbel; Bernd Kleinhens, Gelnhausen; Olaf Kohlhaus, Bad Langensalza; Stephan Mann, Bieber; Ralf Spors, Bruchköbel, all of Fed. Rep. of Germany

[73] Assignee: Rasmussen GmbH, Maintal, Fed. Rep. of Germany

[21] Appl. No.: 962,779

[22] Filed: Oct. 19, 1992

[30] Foreign Application Priority Data

Nov. 28, 1991 [DE] Fed. Rep. of Germany ....... 4139124

[51] Int. Cl.$^5$ .............................................. F16L 21/08
[52] U.S. Cl. .................................... 285/233; 285/319; 285/332; 285/322
[58] Field of Search ............... 285/319, 233, 332, 307, 285/369, 322, 323

[56] References Cited

U.S. PATENT DOCUMENTS

| | | | |
|---|---|---|---|
| 3,711,125 | 1/1973 | Dehar | 285/319 X |
| 4,195,812 | 4/1980 | Norcross | 285/322 X |
| 4,541,658 | 9/1985 | Bartholomew | 285/319 |
| 4,601,497 | 7/1986 | Bartholomew | 285/319 |
| 4,657,286 | 4/1987 | Guest | 285/369 X |
| 4,778,203 | 10/1988 | Bartholomew | 285/319 X |
| 4,981,586 | 1/1991 | Bartholomew | 285/319 X |
| 5,161,834 | 11/1992 | Norkey | 285/319 |
| 5,172,940 | 12/1992 | Usui et al. | 285/302 X |
| 5,181,751 | 1/1993 | Kitanura | 285/322 X |

FOREIGN PATENT DOCUMENTS 3129522 8/1982 Fed. Rep. of Germany.

Primary Examiner—Randolph A. Reese
Assistant Examiner—Heather Chun
Attorney, Agent, or Firm—Darby & Darby

[57] ABSTRACT

One end portion of a pipe, which has a circumferentially extending external bead at the one end portion, is insertable into the internal sockets of an array of arms which are axially movably received in one end portion of a sleeve. The arms have external surfaces which cooperate with an internal surface of the sleeve to permit limited axial movements of the arms between first and second positions. When in the first positions, the arms can be flexed radially outwardly to thus permit insertion of the bead into or its extraction from the sockets. The internal surface of the sleeve and/or the external surfaces of the arms can but need not be conical, either entirely or in part. The sleeve can be inserted into a bore or hole of a nipple on a radiator or carburetor in a motor vehicle. One or more O-rings or other suitable sealing elements are installed between the sleeve and the external surface of the one end portion of the properly installed pipe. The arms can be of one piece with a ring which is confined in the sleeve between the sealing element or elements and the arms.

18 Claims, 2 Drawing Sheets

PIPE COUPLING

BACKGROUND OF THE INVENTION

The invention relates to pipe couplings in general, and more particularly to improvements in pipe couplings called quick connector assemblies which can be used to rapidly establish and rapidly terminate connections between pairs of pipes, tubes, hoses or nipples or between a pipe and another component such as a rod or the like.

It is already known to provide one component of a pipe coupling or an analogous coupling with a circumferentially extending external protuberance, e.g., in the form of a circumferentially complete bead. Such bead facilitates the establishment of a quick release connection between the beaded component and the other component. Reference may be had, for example, to U.S. Pat. No. 4,601,497 granted Jul. 22, 1986 to Bartholomew for "Swivelable quick connector assembly". The patented assembly employs a set of elastomeric arms having internal sockets for portions of the bead. The arms are confined in a sleeve which is in form-locking engagement with the arms when the assembly is in actual use, i.e., when the bead of a pipe extends into the sockets of the arms and the arms cooperate with the sleeve to prevent separation of the beaded component from the other component of the quick connector assembly. The patented assembly further employs one or more O-rings or analogous elastically deformable elements which sealingly engage the two components when the bead is properly received in the sockets of the arms. The arms have accessible end portions which can be flexed radially inwardly in order to disengage the arms from the sleeve and to permit extraction of the arms, together with the beaded component, from the interior of the sleeve. In other words, the beaded component cannot be separated from the sleeve and from the arms in a single operation; it is necessary to extract the beaded component jointly with the arms and to thereupon separate (if necessary) the arms from the extracted beaded component. This presents several problems; for example, the sealing element or elements which are confined in the sleeve must be prevented from escaping upon extraction of the beaded component and of the arms, and this necessitates the provision of one or more additional parts. Another drawback of the patented assembly is that separation of the arms from the extracted beaded component necessitates the exertion of a pronounced force which is likely to entail excessive deformation of the arms and/or of the part which couples the arms to each other. Separation of the arms from the extracted beaded component is necessary when the beaded component is defective but the arms and their coupling are intact or still in a condition which warrants their reuse in the patented assembly to separably connect a fresh beaded component with the sleeve and hence with a second component (such second component can be constituted by the sleeve alone or by a pipe or nipple which is preferably sealingly connected with the sleeve).

German patent application Ser. No. 31 29 522 of Schmidt (published Aug. 5, 1982 and corresponding to East German patent No. 0 154 393) discloses a pipe coupling which constitutes a modification of the quick connector assembly of Bartholomew. Schmidt proposes to confine an annulus of wedge-like locking elements in a sleeve which is axially movably connected to the housing of a check valve. The locking elements have internal sockets for the circumferentially extending external bead of a tubular member in the form of a plug. The latter can be pushed into the sleeve so that its bead penetrates into the sockets of the locking elements against the opposition of a spring which permanently biases the wedge-like external surfaces against the complementary internal surface of a hollow cone. The sleeve must be moved axially of the housing of the check valve in order to enable the locking elements to move apart and to thus permit extraction of the beaded plug from the housing. The pipe coupling of Schmidt comprises a substantial number of parts at least some of which must be finished with a rather high degree of precision. Moreover, and in order to move the sleeve in one direction with reference to the housing of the check valve, it is necessary to overcome the pronounced resistance of resilient means serving to bias the locking elements against the hollow cone and toward the axis of the sleeve.

OBJECTS OF THE INVENTION

An object of the invention is to provide a simple, compact and inexpensive pipe coupling.

Another object of the invention is to provide a quick connector assembly which constitutes an improvement over and a further development of the assembly disclosed in U.S. Pat. No. 4,601,497 to Bartholomew.

A further object of the invention is to provide a novel and improved combination of retaining arms and sleeve for use in the above outlined quick connector assembly.

An additional object of the invention is to provide a quick connector assembly which is constructed and assembled in such a way that the arms need not be separated from the sleeve when the latter is being detached from the externally beaded component of the assembly.

Still another object of the invention is to provide a pipe coupling or quick connector assembly which is constructed and assembled in such a way that the externally beaded component can be connected with or detached from the sleeve and from the arms with the exertion of relatively small effort.

A further object of the invention is to provide a quick connector assembly which can be utilized with advantage under the hood of, and elsewhere in, a motor vehicle.

Another object of the invention is to provide a novel and improved sleeve for use in the above outlined quick connector assembly.

An additional object of the invention is to provide a novel and improved array of arms which can be used in the above outlined quick connector assembly.

Still another object of the invention is to provide a versatile quick connector assembly which can be used as a coupling between pipes or other elongated bodies having identical or different diameters.

A further object of the invention is to provide a novel and improved method of preventing separation of arms from the sleeve during extraction of a pipe or an analogous elongated component from the interior of the sleeve.

Another object of the invention is to provide a quick connector assembly for application as a superior substitute for heretofore known assemblies which are used to establish separable sealing connections between two pipes or other elongated bodies one of which has a circumferentially extending external protuberance in the form of a bead or the like.

An additional object of the invention is to provide a pipe coupling or quick connector assembly whose relatively simple and inexpensive constituents can be mass produced in available machines at a low cost and which can operate satisfactorily even if its components are not machined with a very high degree of precision.

SUMMARY OF THE INVENTION

The invention is embodied in a coupling for releasably engaging an elongated component (e.g., a pipe, tube or hose) of the type having a circumferentially extending external protuberance (e.g., in the form of a circumferentially complete bead bounded by a convex surface). The improved coupling comprises an array of arms serving to surround the elongated component and having internal sockets for the protuberance, and a sleeve which surrounds the arms. The arms and the sleeve are movable relative to each other axially of the sleeve between first and second positions, and the arms are movable substantially radially of the sleeve only in the first positions to permit introduction of the protuberance into and extraction of the protuberance from the sockets.

In accordance with a presently preferred embodiment of the invention, the sleeve has an internal surface and the arms have external surfaces which confront the internal surface. The external surfaces of the arms are spaced apart from the internal surface of the sleeve a first distance in the first positions of the sleeve and the arms relative to each other to permit radially outward movements of the arms relative to the sleeve such as are necessary to introduce the protuberance into or to extract the protuberance from the sockets. The external surfaces of the arms are spaced apart from the internal surface of the sleeve a lesser second distance in the second positions of the sleeve and the arms relative to each other to prevent radially outward movements of the arms relative to the sleeve such as are necessary to introduce the protuberance into or to extract the protuberance from the sockets.

The second distance can equal or approximate zero, i.e., the arms can be held against any radial movements relative to the sleeve when the sleeve and the arms assume the second positions relative to each other.

The external surfaces of the arms can constitute or include conical surfaces. The internal surface of the sleeve can constitute or include a conical surface. If the internal surface is or includes a conical surface and the external surfaces include or constitute conical surfaces, the conicity of the internal surface can match or approximate the conicities of the external surfaces.

The arrangement may be such that the internal and external surfaces are nearer to one than to the other axial end of the sleeve, and such coupling can further comprise a ring which is connected with the arms and is disposed in the sleeve between the external surfaces of the arms and the other axial end of the sleeve. The arms are or can be at least slightly elastic and can be of one piece with the ring. The outer diameter of the ring is or can be larger than the inner diameter of the smallest-diameter portion of the internal surface of the sleeve. Such ring can be a snug fit in the sleeve.

If the improved coupling is to be used as a means for releasably retaining an elongated component having an external protuberance in a tubular second component having a predetermined inner diameter, the outer diameter of the sleeve can match or at least closely approximate the predetermined diameter so that the sleeve can be inserted into and is then a snug fit (particularly a press fit) in the tubular second component.

The tubular second component can be provided with an internal collar adjacent the sleeve and surrounding a portion of the elongated component when the protuberance of the elongated component is introduced into the sockets of the arms. Such coupling can further comprise at least one annular sealing element (e.g., an O-ring) which abuts the collar of the second component and is sealingly received in the sleeve, at least while the sleeve is received in the second component.

The internal collar can be provided directly in the sleeve, and such internal collar is then remote from the aforediscussed surfaces and can serve to surround, center and guide a portion of the properly installed elongated component (while the protuberance of the elongated component extends into the sockets of the arms). The annular sealing element or elements are then disposed in the sleeve between the collar and the arms and sealingly engage the external surface of the properly inserted or introduced elongated component.

The arms can include portions which extend from the sleeve beyond the aforementioned one axial end of the sleeve. Such portions of the arms can overlie an end face of the sleeve and are at least closely adjacent to (or actually abut) the end face in the first positions of the sleeve and the arms relative to each other.

The arms can be provided with preferably frustoconical internal surfaces which diverge toward the sleeve from the respective sockets in a direction away from the other axial end of the sleeve to facilitate introduction of the protuberance into the sockets in the first positions of the arms and the sleeve relative to each other.

The array can comprise two arms which are preferably disposed substantially diametrically opposite each other with reference to the axis of the sleeve and extend in the direction of such axis.

At least one of the aforementioned surfaces is preferably inclined with reference to the axis of the sleeve; thus, such at least one surface can constitute a portion of or an entire conical surface whose axis coincides with the axis of the sleeve.

The internal surface of the sleeve can include a conical portion and a cylindrical portion which is adjacent the conical portion.

The sleeve can contain or can be made of a suitable metallic material, and the arms can contain or can be made of a suitable elastomeric plastic material.

The novel features which are considered as characteristic of the invention are set forth in particular in the appended claims. The improved pipe coupling itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
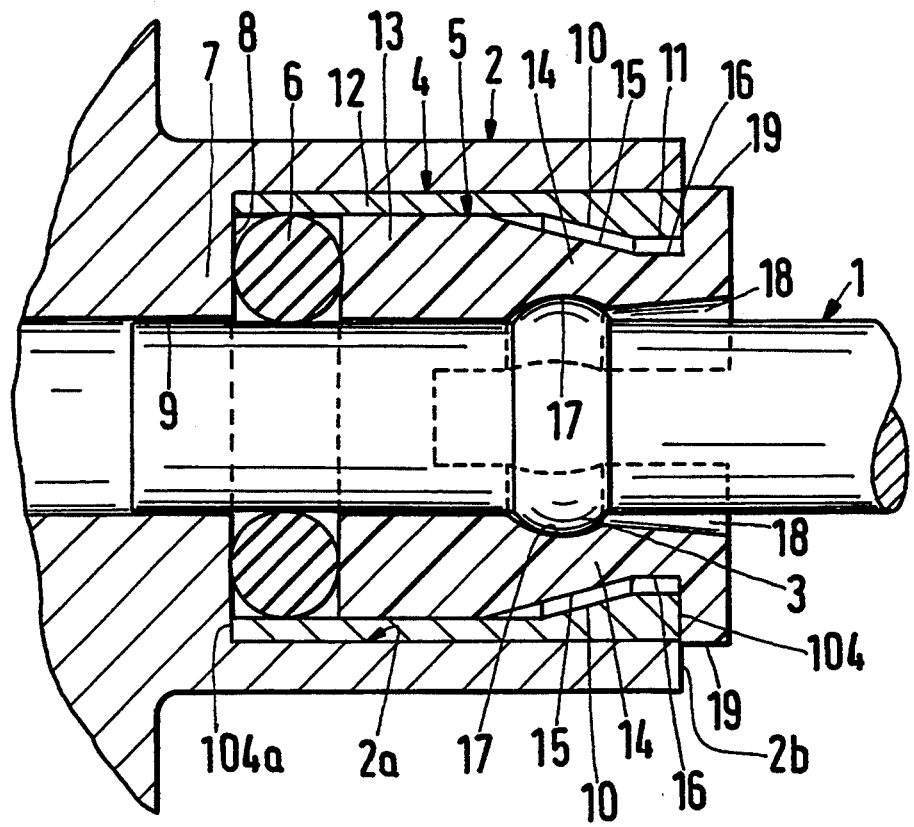
FIG. 1 is an axial sectional view of an assembled pipe coupling which embodies one form of the invention and serves to establish a rapidly terminable connection between a larger-diameter pipe or tube and a smaller-diameter pipe or tube or an analogous elongated component having a circumferentially extending external protuberance.

FIG. 1 shows a fully assembled pipe coupling or quick connector assembly between an elongated first component 1, which can constitute a pipe, a tube or even a hose and has a preferably cylindrical external surface and a circumferentially extending interrupted or circumferentially complete protuberance 3 in the form of a bead (hereinafter called bead), and a tubular second component 2. The latter can constitute a metallic or plastic nipple or an analogous tubular part on a radiator, a carburetor or another constituent of a motor vehicle. The improved-coupling comprises an array of arms 14 which are connected to each other by a ring 13 to jointly form an elongated insert 5, an elongated sleeve 4 which surrounds the major portions of the arms 14 and the entire ring 13, and an annular sealing element 6 which is inserted into the sleeve 4 at the axial end of the sleeve remote from the bead 3. The sleeve 4 is or can be made of a metallic material, and the insert 5 is or can be made of a plastic material, particularly a plastic material which exhibits at least a certain amount of elasticity or flexibility. The nipple 2 is or can be made of a metallic material, the same as the elongated component 1 and its bead 3.

The outer diameter of the sleeve 4 is or can be constant and can match or can closely approximate the inner diameter of the nipple 2 so that the sleeve can be a tight or snug fit (e.g., a press fit) in the nipple. The latter is provided with a collar 7 having an axial passage 9 which centers and guides the free foremost end of the elongated component 1 (hereinafter called pipe for short). The collar 7 is further provided with a radial face 8 which abuts the adjacent end face 104a of the sleeve 4 and is sealingly engaged by the sealing element 6. The latter further engages the adjacent portion of the inner side or surface of the sleeve 4, the adjacent end face 13a of the ring 13, and the adjacent portion of the external surface of the pipe 1 between the bead 3 and the passage 9 of the collar 7 to thus prevent leakage of any fluid which is being conveyed from the interior of the pipe 1 into the carburetor or radiator carrying the nipple 2 or in the opposite direction.

The axial length of the sleeve 4 which is shown in FIG. 1 is selected in such a way that it matches the depth of the axial bore or hole 2a of the nipple 2 between the exposed end face 2b of this nipple and the radially extending face 8 of the internal collar 7. Otherwise stated, a properly inserted sleeve 4 (which can be a press fit in the nipple 2) need not extend axially beyond the end face 2b and its end face 104 is preferably flush with the end face 2b.

In accordance with a feature of the invention, the sleeve 4 is provided with a composite internal surface including a frustoconical portion 10 and a relatively short cylindrical portion 11 between the frustoconical portion 10 and the end face 104. The diameter of the conical portion 10 of the internal surface 10, 11 increases in a direction from the cylindrical portion 11 toward the end face 104a, i.e., in a direction from the free axial end (at 2b) of the nipple 2 toward the sealing element 6. The diameter of the cylindrical portion 11 (this is the smallest diameter portion of the composite internal surface 10, 11 of the sleeve 4) is smaller than the outer diameter of the ring 13 forming part of the insert 5 and being of one piece with the adjacent ends of the arms 14. The inner diameter of the truly cylindrical portion 12 of the sleeve 4 (between the conical portion 10 of the internal surface 10, 11 and the end face 104a) can match or negligibly exceed the outer diameter of the ring 13, i.e., the ring can be a tight fit in the cylindrical portion 12 of the sleeve 4. The inner surface of the portion 12 is or can be a truly cylindrical surface with a constant diameter all the way from the end face 104a to the conical portion 10 of the internal surface 10, 11.

The arms 14 of the insert 5 extend in substantial parallelism with the axis of the sleeve 4 and have composite external surfaces including frustoconical portions 15 (whose conicity preferably matches that of the conical portion 10) and cylindrical portions 16 outwardly adjacent the frustoconical portions 15. The difference between the radii of the cylindrical portions 11, 16 preferably matches or slightly exceeds or is slightly less than the maximum distance between the cylindrical external surface of the pipe 1 and the radially outermost portion of the bead 3. The illustrated insert 5 comprises only two arms 14 which are mirror images of each other with reference to a plane including the axis of the sleeve 4. The two arms 14 are disposed diametrically opposite each other with reference to the axis of the sleeve. The insert 5 can be provided with three or more arms which are preferably equidistant from each other in the circumferential direction of the sleeve 4.

The conical portion 10 of the internal surface of the sleeve 4 and the conical portions 15 of external surfaces of the arms 14 are inclined with reference to the axis of the sleeve and, as already mentioned above, such inclination of the internal surface portion 10 preferably matches or approximates the inclination of portions 15 of the external surfaces 15, 16.

FIG. 1 shows the sleeve 4 and the arms 14 in first axial positions relative to each other in which the cylindrical portions 16 are radially inwardly adjacent but spaced apart from the cylindrical portion 11 and in which the conical portion 10 of the internal surface 10, 11 is adjacent but spaced apart from the conical portions 15 of the external surfaces 15, 16. The sleeve 4 and the arms 14 are movable relative to each other (in the axial direction of the sleeve) to second positions (e.g., by moving the arms 14 in a direction to the right, as viewed in FIG. 1) until the conical portions 15 of the external surfaces 15, 16 strike the conical portion 10 of the internal surface 10, 11 and prevent further axial movement in the direction or directions to extract the insert 5 from the sleeve 4 by moving the arms 14 to the right and/or by moving the sleeve 4 to the left. The axial length of the cylindrical portions 16 of external surfaces 15, 16 can slightly exceed the axial length of the cylindrical portion 11 of the internal surface 10, 11.

The arms 14 are provided with arcuate sockets or recesses 17 which are dimensioned to snugly receive and to be at least substantially filled by portions of the bead 3. The depth of the sockets 17 equals or approximates the aforementioned shortest radial distance of the external surface of the pipe 1 from the radially outermost portion of the bead 3, and such depth equals or can be at least slightly less than the difference between the outer diameter of the composite surface including the cylindrical portions 16 and the diameter of the cylindrical portion 11 when the arms 14 are free, or are compelled, to assume the positions shown in FIG. 1. A plane which is normal to the axis of the pipe 1 and halves the bead 3 preferably also halves the sockets 17 when the bead is properly received in the sockets.

In order to facilitate insertion or introduction of the bead 3 into and its extraction or withdrawal from the sockets 17, the arms 14 are preferably provided with conical internal surfaces 18 each of which extends from the respective socket 17 all the way to the adjacent end face 14a of the respective arm, i.e., the conical internal surfaces 18 diverge in a direction from that axial end of the sleeve 2 which includes the end face 104a toward the other axial end of the sleeve which is nearer the internal surface 10, 11 and the external surfaces 15, 16. The internal surfaces 18 together form a composite conical surface whose axis coincides with that of the sleeve 4. The exposed end portions 19 of the arms 14 can move radially outwardly of the sleeve 4 and away from each other (in order to permit insertion of the bead 3 into or its extraction from the sockets 17 when the sleeve 4 and the arms 14 are maintained in the first positions of FIG. 1 in which the cylindrical portions 16 of the external surfaces 15, 16 are spaced apart from the cylindrical portion 11 of the internal surface 10, 11 of the sleeve 4. The extent of such radial movability of the arms 14 suffices to permit deformation and radial expansion of the arms in response to a pull upon the pipe 1 (in a direction to the right) and/or in response to a pull upon the nipple 2 (in a direction to the left, as viewed in FIG. 1) so that the bead 3 can be extracted from the sockets 17 to thus separate the pipe 1 from the arms 14 and the ring 13 of the insert 5, from the sleeve 4, from the sealing element 6 and from the nipple 2. Thus, such separation or extraction of the pipe 1 does not necessitate extraction of the arms 14 from the sleeve 4; in fact, the arms cannot become separated from the sleeve.

The end portions 19 of the arms 14 extend beyond the right-hand axial end of the sleeve 4 and are closely or immediately adjacent (and can abut) the end face 104 in the first positions of the arms and the sleeve relative to each other. At such time, the pipe 1 can be extracted from the collar 7, sealing element 6, ring 13 and arms 14 provided that the arms are held against axial movement away from the end face 104 of the sleeve 4. However, if the pipe 1 is simply pulled in a direction to the right and the arms 14 are permitted to share such movement of the pipe, the arms move to the aforediscussed second positions in which the conical portions 15 of their external surfaces 15, 16 abut the conical portion 10 of the internal surface 10, 11 of the sleeve 4. Since the sleeve does not yield radially outwardly (it is preferably made of a metallic material and is a press fit in the nipple 2), the arms 14 cannot move radially outwardly and the conical portions 15 of their external surfaces are wedged against the conical portion 10 of the internal surface of the sleeve 4 with a progressively increasing force, i.e., with a force which is proportional to the pull upon the pipe 1. This ensures that the connection between the arms 14, pipe 1 and sleeve 4 is reinforced if the pipe 1 is pulled in a direction to extract its bead 3 from the sockets 17 at a time when the arms 14 are free to leave the first positions which are shown in FIG. 1.

The maximum diameters of conical portions 15 of the external surfaces of the arms 14 preferably match the outer diameter of the ring 13, and the outer diameter of the ring 13 can be only negligibly smaller than the inner diameter of the cylindrical portion 12 of the sleeve 4.

When the radially outwardly extending exposed end portions 19 of the arms 14 abut or are immediately or closely adjacent the end face 104 of the sleeve 4, the ring 13 preferably bears against and subjects the sealing element 6 to a requisite deforming action which suffices to maintain the element 6 in sealing engagement with the cylindrical portion 12 of the sleeve 4, with the face 8 of the collar 7, with the external surface of the adjacent portion of the properly inserted pipe 1, and with the adjacent end face 13a of the ring 13.

The axial position of the insert 5 relative to the sleeve 4 need not be selected in advance in order to permit introduction of the pipe 1 into the insert 5, sealing element 6 and passage 9 of the collar 7 of the nipple 2. Thus, if the insert 5 happens to be in an axial position in which the end portions 19 of the arms 14 are spaced apart from the end face 104 of the sleeve 4, the bead 3 is simply inserted into the space which is surrounded by the conical internal surfaces 18 and the bead begins to push the arms 14 axially of and into the sleeve 4, i.e., the conical portions 15 of the external surfaces 15, 16 of the arms 14 are moved away from the conical portion 10 of the internal surface of the sleeve so that the arms are free to move radially outwardly in response to further insertion of the pipe 1 into the insert 5. Insertion of the pipe 1 is completed when the bead 3 snaps into the sockets 17. The pipe 1 then remains securely and sealingly coupled to the nipple 2 until and unless the operator in charge decides to intentionally separate the pipe 1 and the nipple 2 from each other. Thus, the person in charge looks at the axial position of the insert 5; if the end portions 19 of the arms 14 are remote from the end face 104 of the sleeve 4, the arms 14 must be depressed into the sleeve to assume the (first) positions of FIG. 1, and the arms are thereupon held in such depressed (first) positions while the pipe 1 is being pulled in a direction to the right (as viewed in FIG. 1). This causes the bead 3 to bear against the surfaces bounding the sockets 17 and to move the end portions 19 of the arms 14 radially outwardly whereby the bead 3 ultimately leaves the sockets 17 and begins to slide along the internal surfaces 18 to thus complete the separation of pipe 1 from the arms 14, ring 13, sealing element 6, sleeve 4 and nipple 2.

As a rule (for example, if the nipple 2 is of one piece with or is attached to a carburetor or to a radiator in a motor vehicle), the nipple will be stationary so that attachment of the pipe 1 to or its disengagement from the nipple (and more specifically from the arms 14) will involve axial movements of the pipe relative to the sleeve 4. The sleeve 4 remains in the nipple 2 because it is a press fit therein or because it is bonded or otherwise securely mounted in the nipple.

The ring 13 constitutes a desirable but optional feature of the improved coupling. In addition to preventing misorientation of the arms 14 relative to each other and/or relative to the sleeve 4, this ring further serves to center and guide the pipe 1 between the bead 3 and the axial passage 9 of the collar 7. In addition, the ring 13 prevents forcible extraction of the arms 14 from the sleeve 4 in a direction to the right, as viewed in FIG. 3. As mentioned above, the outer diameter of the ring 13 is larger than the smallest diameter (of the cylindrical portion 11) of the internal surface 10, 11 of the sleeve 4. The insert 5 can be introduced into the sleeve 4 in a direction from the left, as viewed in FIG. 1; all that is necessary is to press the end portions 19 of the arms 14 toward each other so that they can enter the cylindrical portion 12 of the sleeve 4; the end portions 19 move radially and away from each other as soon as they are advanced beyond the end face 104 of the sleeve 4.

The ring 13 performs still another desirable function, namely of properly locating the sealing element 6 in the cylindrical portion 12 of the sleeve 4 in an optimum axial position and of cooperating with the face 8 of the collar 7 to ensure reliable and adequate deformation of the sealing element 6 when the sleeve 4 is properly installed in the bore or hole 2a of the nipple 2. By providing the ring 13, one can save a separately produced part which is used in heretofore known pipe couplings (e.g., in the quick connector assembly of Bartholomew) to properly retain the sealing element or elements in the sleeve. Omission of a separately produced retaining part for the sealing element or elements is possible because the arms 14 of the improved coupling are not extracted from the sleeve 4 with the pipe 1.

It is clear that the sleeve 4 can be installed in the nipple 2 by resorting to bolts, screws, threads and/or other mechanical fasteners. A press fit is preferred at this time because this entails savings in parts and simplifies the assembly of the sleeve 4 with the nipple 2.

The collar 7 also constitutes an optional but desirable feature of the improved coupling, and more specifically of the nipple 2. This collar ensures predictable deformation of the sealing element 6 to thus ensure the establishment of an optimal sealing action between the nipple 2 and the pipe 1.

An advantage of outwardly extending end portions 19 of the arms 14 is that they can be readily engaged by fingers or by a suitable tool in order to push them against the end face 104 of the sleeve 4 when the person in charge desires to maintain the arms and the sleeve in their first positions relative to each other, i.e., to permit introduction of the bead 3 into or its extraction from the sockets 17. Furthermore, the end portions 19 enable the person in charge to ascertain that the sleeve 4 and the arms 14 have assumed proper (first) positions (in which the arms can be flexed or otherwise moved radially outwardly) in that the end portions 19 then abut the end face 104.

The internal surfaces 18 of the arms 14 simplify and facilitate the task of the person in charge of introducing the bead 3 into the sockets 17 of the arms 14.

Figure 4:
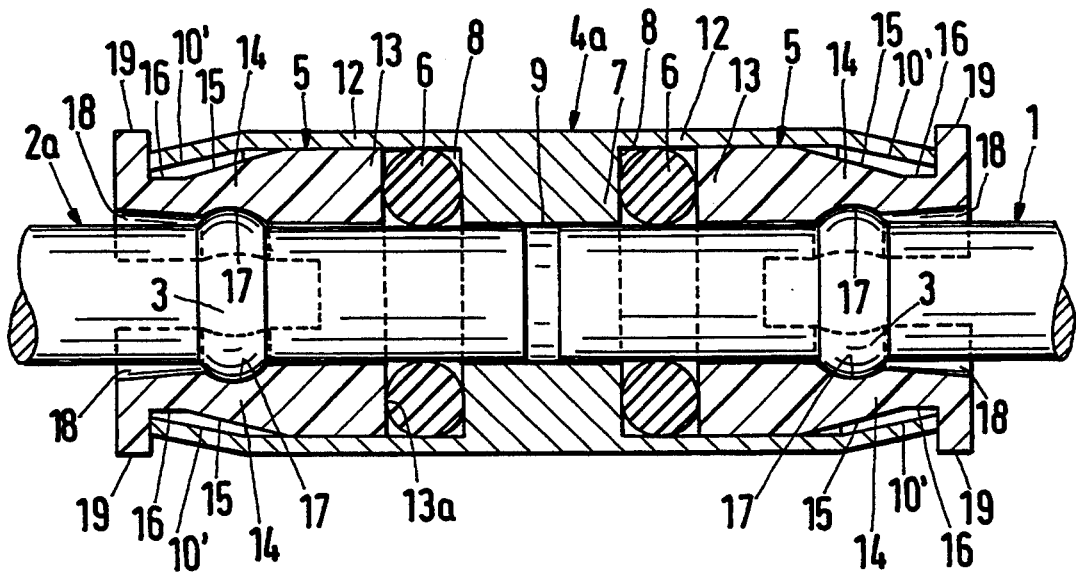
FIG. 4 is an axial sectional view of a fully assembled second coupling wherein a single sleeve serves to receive two arrays of arms and can confine the externally beaded portions of two elongated tubular or non-tubular components.

FIG. 4 shows a modified pipe coupling or quick connector assembly wherein a single (modified) sleeve 4a serves to receive two arrays of arms 14, two sealing elements 6 and the externally beaded end portions of two pipes 1, 2a which may but need not be mirror images of each other. The right-hand array of arms 14 forms part of a first insert 5 which further includes a ring 13 serving to connect the arms 14 to each other, and this insert is a mirror image of a second insert 5 including the arms 14 which releasably hold or retain the bead 3 of the pipe 2a.

The central portion of the sleeve 4a is provided with an internal collar 7 which is disposed between the two annular sealing elements 6 and has a passage 9 long enough to receive, guide and center the free end portion of the pipe 1 as well as to receive, guide and center the free end portion of the pipe 2a.

Figure 2:
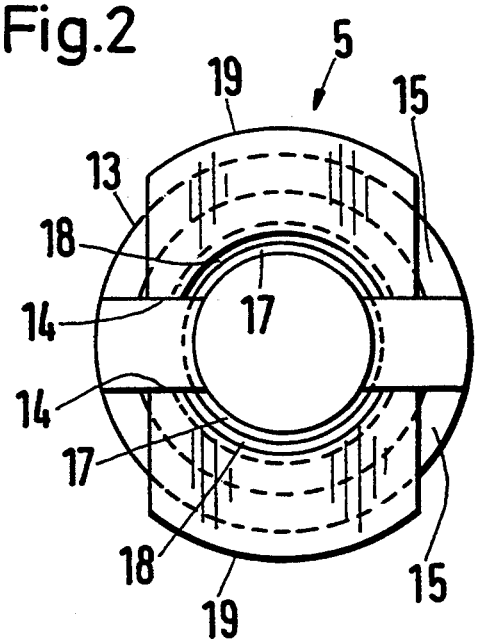
FIG. 2 is an end elevational view of the arms and ring forming integral parts of an insert in the pipe coupling of FIG. 1.
Figure 3:
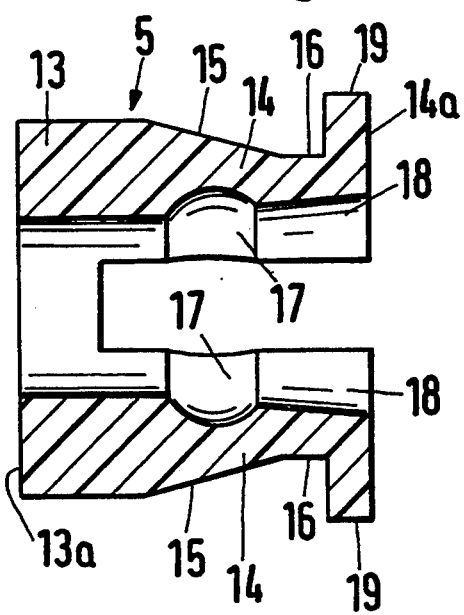
FIG. 3 is an axial sectional view of the structure which is shown in FIG. 2.

The internal surfaces 10' at the axial ends of the sleeve 4a are different from the composite internal surface 10, 11 of the sleeve 4 of FIG. 1 in that the internal surfaces 10' do not or need not include cylindrical portions corresponding to the cylindrical portion 11 of the internal surface 10, 11 shown in FIG. 1. The external surfaces 15, 16 of the arms 14 in the coupling of FIG. 4 are or can be identical with those of the arms which are shown in FIGS. 1, 2 and 3.

The radially extending faces 8 of the collar 7 in the sleeve 4a cooperate with the end faces 13a of the adjacent rings 13 in order to maintain the respective sealing elements 6 in deformed condition, i.e., in adequate sealing engagement with the adjacent faces 8, with the external surfaces of the respective pipes 1, 2a, with the inner surfaces of the respective cylindrical portions 12 of the sleeve 4a and with the end faces 13a of the adjacent rings 13.

The manner in which the pipe 1 or 2a of the structure shown in FIG. 4 can be withdrawn from or reinserted into the respective array of arms 14 is the same as described with reference to the pipe 1 of FIG. 1.

Figure 5:
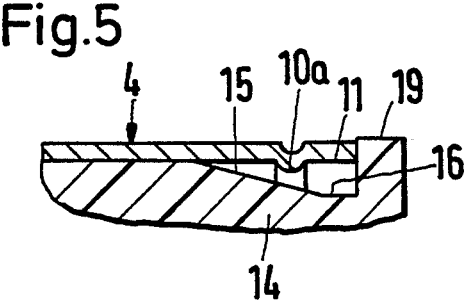
FIG. 5 is a fragmentary axial sectional view of an arm and of one end portion of a sleeve which constitutes a modification of the sleeves shown in FIGS. 1 and 4.

FIG. 5 shows a portion of a third pipe coupling wherein the internal surface of the sleeve 4 is provided with a circumferentially extending corrugation bounded by a convex surface 10a adjacent a cylindrical portion 11. The configuration of the external surface 15, 16 of the arm 14 which is shown in FIG. 5 is or can be the same as that of the external surface of any one of the arms shown in FIGS. 1 to 4. The sleeve 4 and the arm 14 of FIG. 5 assume their second positions (in which the end portion 19 of the arm 14 cannot move radially outwardly or cannot move radially outwardly to an extent necessary to permit introduction of a bead 3 into a set of sockets 17) when the arm 14 is shifted to the right and/or the sleeve is shifted to the left so that the convex portion 10a of the internal surface of the sleeve 4 abuts the concave portion 15 of the external surface 15, 16 of the arm 14. The feature of FIG. 5 can be incorporated with equal advantage into the left-hand half and/or into the right-hand half of the coupling which is shown in FIG. 5. The main difference between the structure of FIG. 5 and those shown in FIGS. 1 and 4 is that the internal surface of the sleeve 4 shown in FIG. 5 does not have a pronounced or clear-cut conical portion (with the possible exception of the left-hand half of the convex surface 10a on the corrugation of the sleeve 4).

Figure 6:
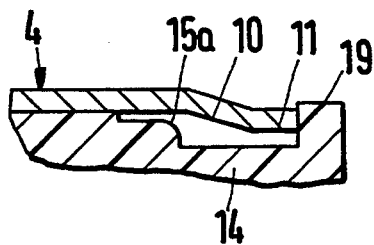
FIG. 6 is a similar fragmentary axial sectional view of a sleeve resembling the sleeve of FIG. 4 and of an arm constituting a modification of the arms shown in FIGS. 1 to 5.

FIG. 6 shows a portion of a fourth pipe coupling or quick connector assembly wherein the internal surface 10, 11 of the sleeve 4 resembles that of the sleeve which is shown in FIG. 1. The external surface of this sleeve somewhat resembles that of the right-hand or left-hand end portion of the sleeve 4a which is shown in FIG. 4. The external surface of the arm 14 which is shown in FIG. 6 includes a circumferentially extending convex portion 15a which replaces the conical portion 15 and comes into abutment with the conical portion 10 of the internal surface 10, 11 of the sleeve 4 when the sleeve and the arm of FIG. 6 are caused to assume their second positions. The convex portion 15a preferably does, but need not always, extend circumferentially of the entire arm 14. Such arm can be used in the pipe coupling of FIG. 1, in the pipe coupling of FIG. 4 or in the pipe coupling of FIG. 5. The main difference between this arm and the arms of FIGS. 1 to 5 is that the arm of FIG. 6 does not have an external surface with a pronounced conical portion such as the conical portions 15 of the previously described arms.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A coupling for releasably engaging an elongated component having a circumferentially extending external protuberance, comprising an array of arms arranged to surround the component and having sockets for the protuberance; and a sleeve surrounding said arms, said arms and said sleeve being movable relative to each other axially of said sleeve between a first operable axial position and second operable axial position that is spaced form sad first position and said arms being movable radially of said sleeve only in said first position to permit introduction of the protuberance into and extraction of the protuberance form said sockets, said sleeve has an internal surface and said arms have external surfaces confronting said internal surface, said external surfaces being spaced apart from said internal surface by a first distance in said first position to permit radially outward movements of said arms relative to said sleeve such as are necessary to introduce the protuberance into or to extract the protuberance form said sockets, said external surfaces being spaced apart from said internal surface by a lesser second distance in said second position to prevent radially outward movements of said arms relative to said sleeve such as are necessary to introduce the protuberance into or to extract the protuberance form said sockets, said sleeve has first and second axial ends and said surfaces are nearer to said first than to said second axial end, said arms having portions extending from said sleeve beyond said first axial end.

2. The coupling of claim 1, wherein said second distance at least approximates zero.

3. The coupling of claim 1, wherein said external surfaces include conical surfaces.

4. The coupling of claim 1, wherein said internal surface includes a conical surface.

5. The coupling of claim 1, wherein said surfaces include conical surfaces having at least substantially identical conicities.

6. The coupling of claim 1, wherein said sleeve has first and second axial ends and said surfaces are nearer to said first end than to said second end, and further comprising a ring connected with said arms and disposed in said sleeve between said external surfaces and said second end.

7. The coupling of claim 6, wherein said arms are at least slightly elastic and are of one piece with said ring.

8. The coupling of claim 6, wherein said ring has an outer diameter and said internal surface includes a portion with an inner diameter smaller than said outer diameter.

9. The coupling of claim 6, Wherein said ring is a snug fit in said sleeve.

10. The coupling of claim 1 for releasably retaining an elongated component in a tubular component having a predetermined inner diameter, wherein said sleeve has an outer diameter which least closely approximates said predetermined inner diameter so that the sleeve can be inserted into and is then a press fit in the tubular component.

11. The coupling of claim 1 for releasably retaining an elongated component in a tubular component which receives said sleeve and has an internal collar adjacent the sleeve and surrounding a portion of the elongated component when the protuberance of the elongated component is introduced into said sockets, and further comprising at least one annular sealing element abutting the collar and sealingly received in said sleeve.

12. The coupling of claim 1, wherein said sleeve comprises an internal collar remote from said surfaces and surrounding a portion of the elongated component when the protuberance of such component is introduced into said sockets, and further comprising an annular sealing element disposed in said sleeve between said collar and said arms.

13. The coupling of claim 1, wherein said first axial end has an end face and said portions of said arms overlie and are at least closely adjacent said end face in said first position.

14. The coupling of claim 1, wherein said sleeve has a first axial end nearer to and a second axial end more distant from said arms, said arms having internal surfaces which diverge toward said sleeve from the respective sockets in a direction away from said second axial end to facilitate introduction of the protuberance into said sockets in the first positions of said arms and said sleeve relative to each other.

15. The coupling of claim 1, wherein said array comprises two arms which are disposed substantially diametrically opposite each other with reference to the axis of said sleeve and extend in the direction of such axis.

16. The coupling of claim 1, wherein at least one of said surfaces is inclined with reference to the axis of said sleeve.

17. The coupling of claim 1, wherein said internal surface includes a conical portion and a cylindrical portion adjacent the conical portion.

18. The coupling of claim 1, wherein said sleeve contains a metallic material and said arms contain an elastomeric plastic material.

* * * * *